(12) United States Patent
Kusama et al.

(10) Patent No.: US 8,252,455 B2
(45) Date of Patent: Aug. 28, 2012

(54) BATTERY PACK, VEHICLE EQUIPPED WITH THE BATTERY PACK, AND DEVICE EQUIPPED WITH THE BATTERY PACK

(75) Inventors: Kazuyuki Kusama, Nagoya (JP); Yasushi Hirakawa, Moriguchi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/013,979

(22) Filed: Jan. 26, 2011

(65) Prior Publication Data

US 2011/0123845 A1    May 26, 2011

Related U.S. Application Data

(63) Continuation of application No. PCT/JP2009/059513, filed on May 25, 2009.

(51) Int. Cl.
*H01M 2/12* (2006.01)
(52) U.S. Cl. ......... 429/164; 429/178; 429/149; 429/170
(58) Field of Classification Search .................. 429/164, 429/178, 149, 170
See application file for complete search history.

(56) References Cited

FOREIGN PATENT DOCUMENTS

| JP | 9-92263 | 4/1997 |
|----|---------|--------|
| JP | 2574427 | 3/1998 |
| JP | 2004-362956 | 12/2004 |
| JP | 2005-251548 | 9/2005 |
| JP | 2006-19140 | 1/2006 |
| JP | 2008-171678 | 7/2008 |
| JP | 2009-99286 | 5/2009 |

OTHER PUBLICATIONS

International Search Report in International Application No. PCT/JP2009/059513; Mailing Date: Aug. 25, 2009.

*Primary Examiner* — Jane Rhee
(74) *Attorney, Agent, or Firm* — Finnegan, Henderson, Farabow, Garrett & Dunner, LLP

(57) ABSTRACT

A secondary battery includes a cylindrical battery case, a positive and negative electrode body group, a top plate and a battery lid connected to first and second electrode bodies of the electrode body group respectively. The secondary battery further includes a current collector placed on an end of the electrode body group on the top plate side and connected to the first electrode body of the electrode body group and a spacer placed between the top plate and the current collector. The top plate is partly formed with a thin portion. The spacer is formed with through holes in positions corresponding to the thin portion. The portion of the current collector corresponding to the thin portion is in contact with the thin portion through the through hole. The thin portion is deformed when the internal pressure of the battery case rises, thereby breaking electric connection between the top plate and the current collector.

4 Claims, 10 Drawing Sheets

BATTERY PACK, VEHICLE EQUIPPED WITH THE BATTERY PACK, AND DEVICE EQUIPPED WITH THE BATTERY PACK

CROSS-REFERENCE TO RELATED APPLICATIONS

This application is a continuation application based upon and claims the benefit of the prior PCT International Patent Application No. PCT/JP2009/059513 filed on May 25, 2009, the entire contents of which are incorporated herein by reference.

TECHNICAL FIELD

The present invention relates to a battery pack including a plurality of cylindrical secondary batteries each having end faces provided with a positive electrode and a negative electrode respectively and being connected in combination with each other, and further a vehicle equipped with the battery pack and a device equipped with the battery pack. More particularly, the present invention relates to a battery pack in which a battery is connected to an adjacent battery with a metal plate (a bus bar) that connects positive and negative electrodes of the batteries, a vehicle equipped with the battery pack and a device equipped with the battery pack.

BACKGROUND ART

Heretofore, in some cases, gas accumulates in secondary batteries such as lithium ion secondary batteries due to overcharge, excessive temperature rise, breakage by external force, and other reasons. That gas may increase the internal pressure of the secondary battery. Accordingly, a battery case of the secondary battery is usually formed with an explosion-proof valve. This explosion-proof valve is designed to break in case the internal pressure exceeds a predetermined value, thereby releasing the internally accumulated gas to the outside. There is also an explosion-proof valve designed to not only release gas but also break a current path at the valve position.

Furthermore, some of the secondary batteries are provided with a current breaking structure in addition to the explosion-proof valve for releasing gas (refer to e.g. Patent Literature 1). This Literature proposes a cylindrical secondary battery formed with an explosion-proof valve at one end side and a current breaking structure at the other end side. This current breaking structure is configured to swell the bottom wall of a battery case due to the increased internal gas pressure. Accordingly, when the internal pressure reaches a predetermined pressure, a welded portion at the center of an inner surface of the bottom wall is separated. This cuts off the current before the explosion-proof valve is broken.

Further, there is also a case where a plurality of the above secondary batteries is connected to each other and used as a battery pack. For instance, cylindrical batteries each including positive and negative electrodes formed at both ends respectively are arranged so that respective tops and bottoms are alternately reversed. The positive and negative electrodes of the adjacent batteries are connected to each other with bus bars.

CITATION LIST

Patent Literature

Patent Literature 1: JP 2004-362956A

SUMMARY OF INVENTION

Technical Problem

However, the following problems occur in the case where the secondary battery including the current breaking structure disclosed in the aforementioned literature is used in the conventional battery pack. As the bus bar, a relatively thick metal plate is generally adopted for the need of passing a large amount of current. Such bus bar is hardly flexible. Specifically, even when the internal pressure of the secondary battery rises, the bottom wall of the battery case could not freely swell as long as the bus bar is fixed in contact with the bottom wall. This arrangement causes a problem that a current is not cut off even when the internal pressure reaches the predetermined pressure.

The present invention has been made to solve the above problems with the aforementioned conventional battery pack. Specifically, a purpose of the invention is to provide a battery pack capable of appropriately exhibiting the function of a current breaking structure even when used as a battery pack having a connection using a bus bar, a vehicle equipped with the battery pack, and a device equipped with the battery pack.

Solution to Problem

To achieve the above purpose, one aspect of the invention provides a battery pack comprising a plurality of secondary batteries and a bus bar connecting the secondary batteries, each secondary battery comprising a cylindrical battery case, a positive and negative electrode body group housed in the battery case, and first and second terminal plates located on both ends of the battery case and connected to first and second electrode bodies of the electrode body group respectively, wherein the secondary battery further includes: a current collector placed on an end of the electrode body group on the first terminal plate side, the current collector being connected to the first electrode body of the electrode body group; and an insulating member placed between the first terminal plate and the current collector, the first terminal plate is partly formed with a thin portion, the insulating member is formed with a through portion in a position corresponding to the thin portion of the first terminal plate, a portion of the current collector placed in a position corresponding to the thin portion of the first terminal plate is in contact with the thin portion of the first terminal plate through the through portion of the insulating member, and the thin portion of the first terminal plate is to be deformed outward when internal pressure of the battery rises, thereby breaking electric connection between the first terminal plate and the current collector, and the bus bar is placed so that a portion of the bus bar connected to the first terminal plate of the secondary battery covers a portion of the first terminal plate other than the thin portion.

According to the above battery pack, when the internal pressure of the battery case increases due to the generation of gas or other reasons, the battery case and the first and second terminal plates are pushed outward from inside. Herein, the first terminal plate is partly formed with the thin portion. This thin portion is in contact with the current collector through the through portion of the insulating member. This current collector is connected to the first electrode body of the electrode body group. In the above configuration, this thin portion is deformed outward due to an increase in internal pressure of the battery case, thereby breaking electric connection between the first terminal plate and the current collector. In the secondary battery in this configuration, specifically, since the electric connection between the first terminal plate and the first electrode body of the electrode body group is broken, a current is cut off. It is to be noted that the first and second terminal plates may be provided both as separate components from the battery case or provided one as a separate component from the battery case and the other as a bottom portion of a closed-end battery case. Even when connected by the bus bar as the battery pack, the secondary batteries having the above configuration can appropriately carry out the function of the current breaking structure.

Furthermore, in the above aspect of the invention provides, preferably, the electrode body group is a hollow wound body including the first and second electrode bodies wound in overlapping relation with a central portion being hollow, and the current collector and the insulating member are formed with through holes communicated with the hollow portion of the hollow wound body.

The above configuration allows gas generated in the electrode body group to flow toward both end portions of the battery case through a hollow portion of the hollow wound body and the through holes of the current collector and the insulating member. Thus, the increase in internal pressure is easily transmitted to the first terminal plate. Thereby, the thin portion of the first terminal plate is pushed. This through hole may be formed to be continuous with the above through portion or the outside of the insulating member.

Furthermore, in the above aspect of the invention provides, preferably, the second terminal plate is provided with an explosion-proof valve which will be cleaved for releasing gas out of the battery case when internal pressure of the battery case rises, and the thin portion of the first terminal plate is to be deformed at lower internal pressure than internal pressure of the battery case at which the explosion-proof valve functions.

The above configuration can first cut off the current and then operate the explosion-proof valve only in case the internal pressure still further increases.

Another aspect of the invention provides a vehicle comprising: a motor that will be driven to rotate by receiving supply of electric power; and a power source for supplying electric power to the motor, the power source including the aforementioned battery pack.

Furthermore, another aspect of the invention provides a device comprising: an operating part that will be driven by receiving supply of electric power; and a power source for supplying electric power to the operating part, the power source including the aforementioned battery pack.

Advantageous Effects of Invention

According to the battery pack, the vehicle equipped with the battery pack, and the device equipped with the battery pack in the above configurations, the function of a current breaking structure can be carried out appropriately.

DESCRIPTION OF EMBODIMENTS

A detailed description of a preferred embodiment of the present invention will now be given referring to the accompanying drawings. This embodiment embodies the present invention applied to a battery pack using a cylindrical lithium ion secondary battery.

Figure 1:
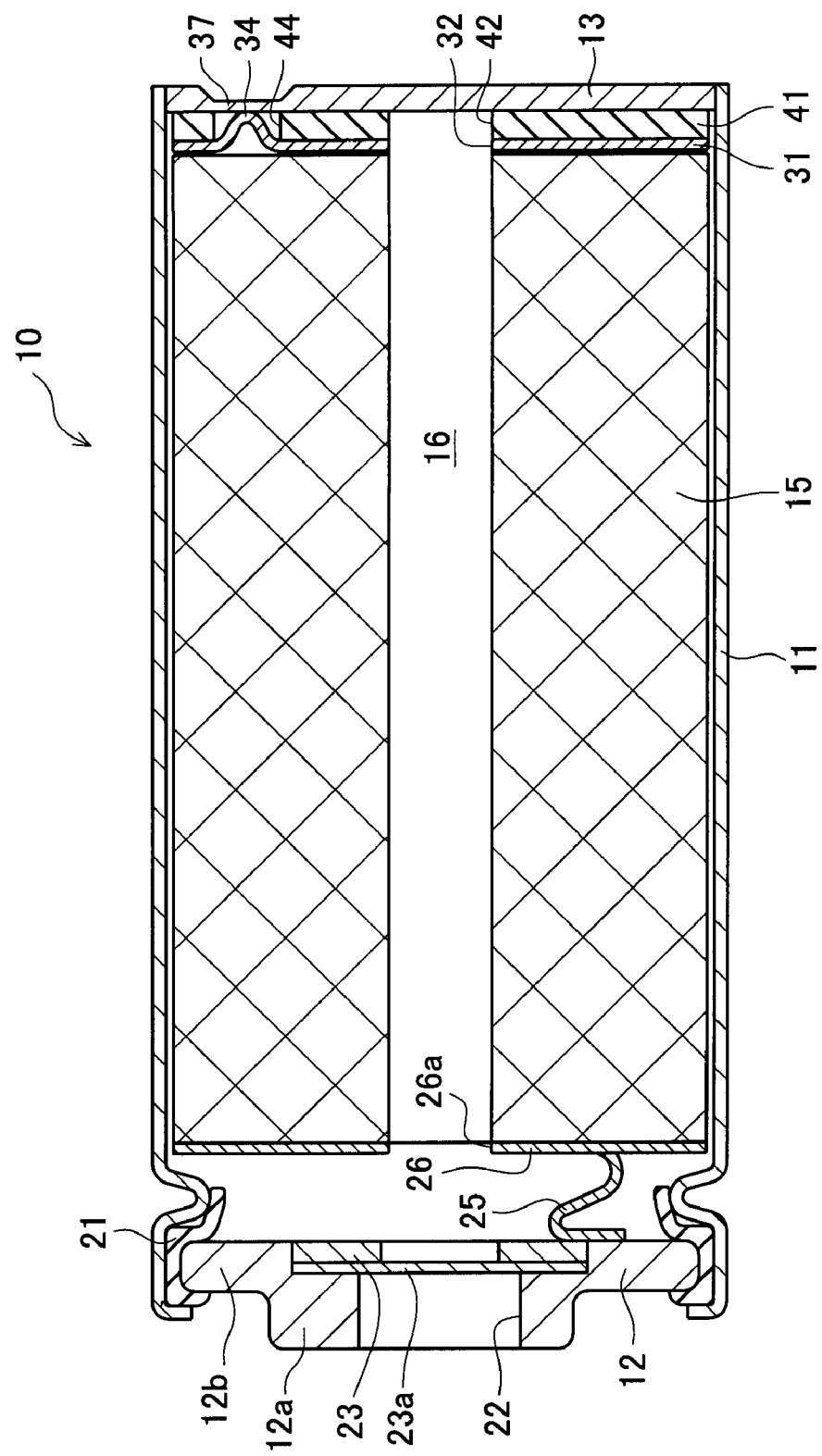
FIG. 1 is a cross sectional view of a secondary battery in an embodiment.

A lithium ion secondary battery 10 in a battery pack in this embodiment includes, as shown in a cross sectional view in FIG. 1, a cylindrical battery case 11, a battery lid 12 and a top plate 13, which close both ends of the case 11 respectively. The battery case 11 houses an electrode body group 15. The electrode body group 15 includes positive and negative electrode plates being wound in a cylindrical form by interposing separators therebetween and impregnated with an electrolyte solution. The electrode body group 15 centrally has a core space 16 formed after removed of a wound core to extend through the electrode body group 15. That is, the electrode body group 15 in this embodiment is a hollow wound type. Each of the electrode plates, the separator, and the electrolyte solution may be selected from usually used ones for secondary batteries. For examples, the followings are selectable.

The positive electrode plate is a plate made of an aluminum foil coated with a positive active material capable of storing and releasing lithium ions. The positive active material is selectable from e.g. lithium composite oxide such as lithium nickel oxide ($LiNiO_2$), lithium manganese oxide ($LiMnO_2$), lithium cobalt oxide ($LiCoO_2$). Further, the negative electrode plate is a plate made of a copper foil coated with a negative active material capable of storing and releasing lithium ions. The negative active material is selectable from e.g. carbonaceous matters such as amorphous carbon, hard-graphitized carbon, easy-graphitized carbon, and graphite.

The electrolyte solution is prepared by dissolving an electrolyte in an organic solvent. The organic solvent is selectable from e.g. ester solvents such as propylene carbonate (PC), ethylene carbonate (EC), dimethyl carbonate (DMC), and methyl ethyl carbonate (MEC), and organic solvents prepared by combining the ester solvent with an ether solvent such as γ-butyrolacton (γ-BL) and diethoxyethane (DEE). Further, salt which is an electrolyte is selectable from e.g. lithium salt such as lithium perchlorate ($LiClO_4$), lithium fluoroborate ($LiBF_4$), and lithium hexafluorophosphate ($LiPF_6$).

The battery lid 12 is fixed to a left end of the battery case 11 as shown in FIG. 1. The battery lid 12 includes a thick central portion 12a and, around the central portion 12a, a flange 12b thinner than the central portion 12a. At the outer periphery of the flange 12b, the battery lid 12 is fixed to the battery case 11 through a gasket 21 by bending. The battery lid 12 is formed with a through hole 22 in the central portion 12a. On the inner surface side of the battery lid 12, an explosion-proof valve 23 is fitted to close the through hole 22. The explosion-proof valve 23 is formed with a thin portion 23a having a very thin thickness. When the internal pressure of the secondary battery 10 increases beyond a predetermined value, the thin portion 23a is broken, releasing gas out of the secondary battery 10.

The battery lid 12 is connected to a current collector 26 through a connecting part 25 as shown in FIG. 1. The current collector 26 is located on a left end of the electrode body group 15 in the figure. The current collector 26 is connected to the negative electrode plate of the electrode body group 15 by welding or other techniques. The current collector 26 covers the left end of the electrode body group 15 in the figure excepting a portion corresponding to the core space 16 (a through hole 26a). Those battery lid 12, connecting part 25, and current collector 26 are electrically conductive members. Thus, the battery lid 12 serves as a terminal plate on a negative terminal side of the secondary battery 10.

The top plate 13 is located on a right end of the battery case 11 as shown in FIG. 1. This top plate 13 closes the right end of the battery case 11. The battery case 11 and the top plate 13 are fixed by welding or other techniques. Between the right end of the electrode body group 15 in the figure and the top plate 13, there are placed a current collector 31 and a spacer 41 in this order from the electrode body group 15 side. The top plate 13 and the current collector 31 are electrically conductive members. The spacer 41 is an insulating member.

Figure 2:
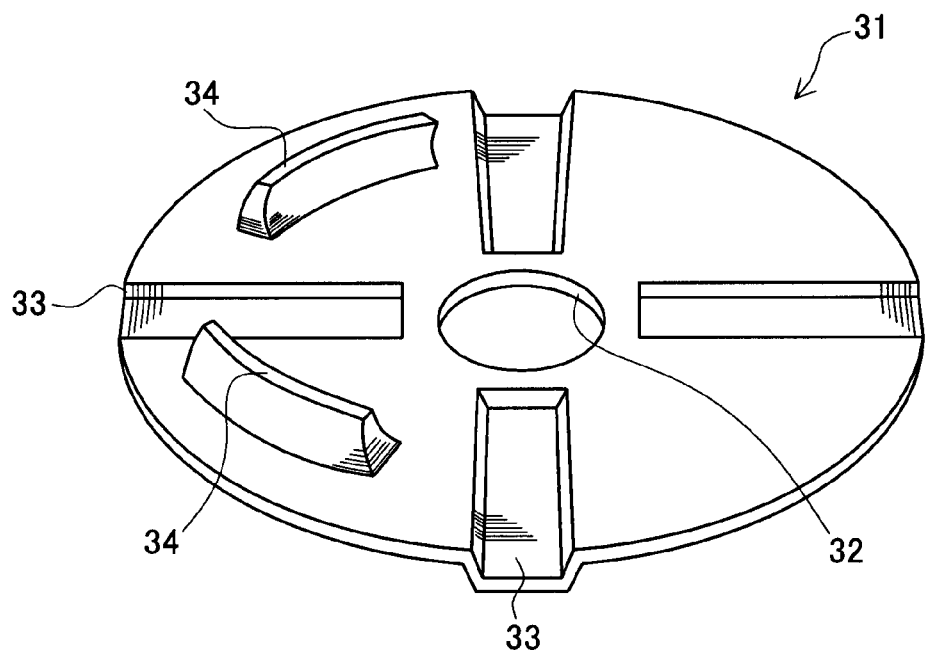
FIG. 2 is a perspective view of a current collector.

The current collector 31 covers the right end of the electrode body group 15 in the figure excepting a portion corresponding to the core space 16 as shown in FIG. 1. The current collector 31 in this embodiment is a member having an almost circular disk-like outer shape as shown in FIG. 2. An upper surface in FIG. 2 corresponds to a right surface in FIG. 1. The current collector 31 is formed with a through hole 32 at the center corresponding to the core space 16.

The current collector 31 has four recessed portions 33 formed in a cross arrangement around the central through hole 32 as shown in FIG. 2. Further, protrusions 34 are formed at two places each between the recessed portions 33. The current collector 31 including the recessed portions 33 and the protrusions 34 is made of a plate material by press work. That is, the thickness thereof is entirely almost uniform.

Figure 3:
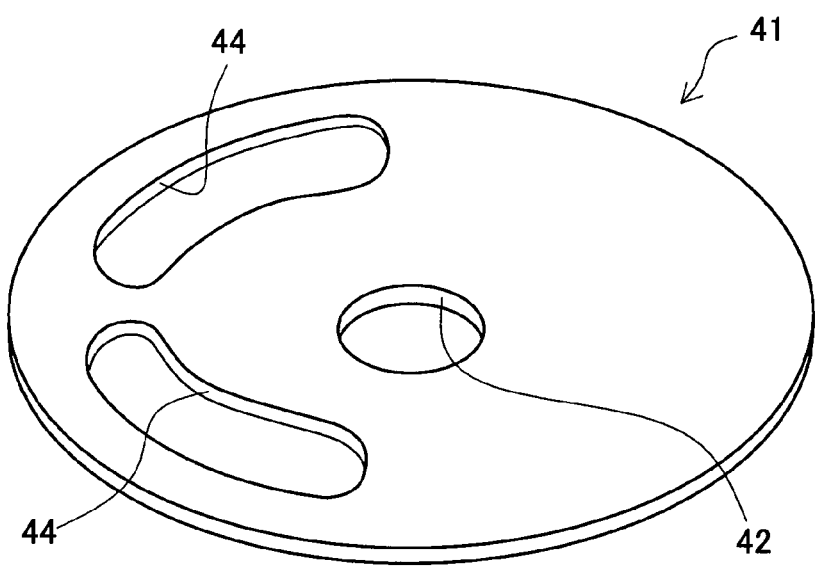
FIG. 3 is a perspective view of a spacer.

The spacer 41 is placed between the current collector 31 and the top plate 13 as shown in FIG. 1. This spacer 41 is made of an insulating material especially high resistant to heat and electrolyte solution. The spacer 41 is a member having an almost circular disk-like outer shape formed with three through holes 42, 44, and 44 as shown in FIG. 3. Of them, the through hole 42 is located in a position corresponding to the core space 16 of the electrode body group 15.

The two through holes 44 are arranged in positions corresponding to the protrusions 34 of the current collector 31. Specifically, when the current collector 31 and the spacer 41 are placed in overlapping relation as shown in FIG. 1, the protrusions 34 of the current collector 31 pass through the through holes 44 and protrude rightward from the spacer 41 in the figure. A protruding end of each protrusion 34 thus contacts with the surface of an inner side (a left surface in the figure) of the top plate 13.

Figure 4:
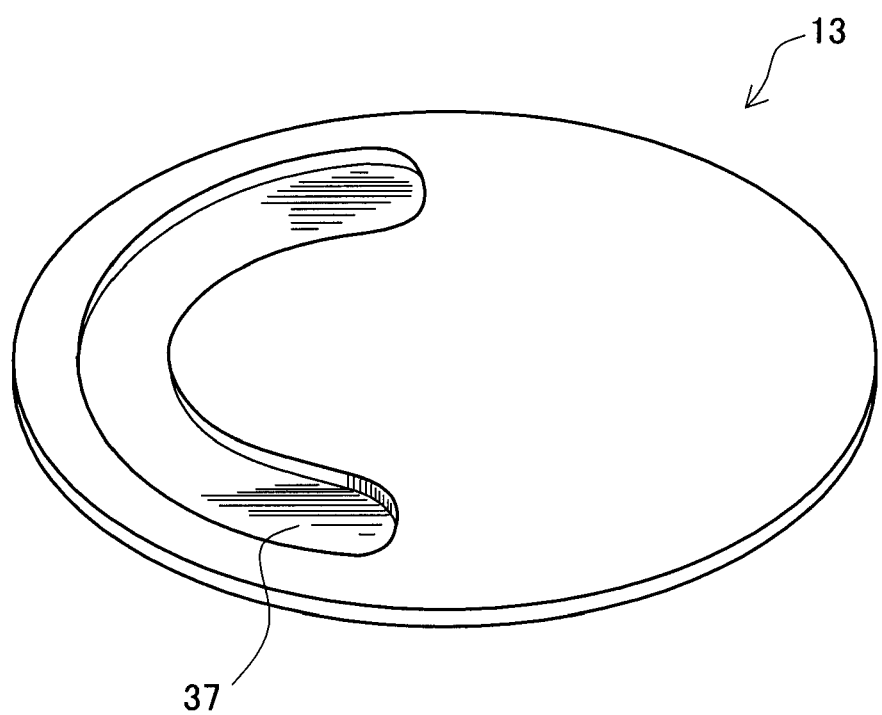
FIG. 4 is a perspective view of a top plate.

The top plate 13 is further formed with a circular-arc thin portion 37 as shown in FIG. 4. This thin portion 37 is formed to be thinner than other portions of the top plate 13 and hence relatively easy to deform. This thin portion 37 is arranged in correspondence with the positions of the protrusions 34 of the current collector 31. In other words, the thin portion 37 is formed in a circular arc shape including at least a range contacting the protrusions 34 and a certain area around them. Herein, the thin portion 37 is illustrated as a single form having a size including the range over the two protrusions 34, but may be provided as two thin portions in one-to-one correspondence with the protrusions 34.

In the secondary battery 10 in the present embodiment shown in FIG. 1, the top plate 13 is joined, at a back surface of the thin portion 37 (i.e. a lower surface not seen in FIG. 4), with the protruding end of each protrusion 34 of the current collector 31 by welding. The current collector 31 is joined, at a back surface of each recessed portion 33 (a lower surface not seen in FIG. 2), with the positive electrode plate of the electrode body group 15 by welding or other techniques. Accordingly, the positive electrode plate of the electrode body group 15 and the top plate 13 are electrically connected via the current collector 31. The top plate 13 is a positive terminal plate on a positive electrode side of the secondary battery 10 and functions as a positive terminal. The welding method for each welding portions may be achieved by a known technique such as resistance welding and laser welding.

An example of the size and the thickness of each part in a general secondary battery of 5 Ah size is shown as below. The battery having such conditions as mentioned below can realize a current breaking structure that operates at an internal pressure of about 1 MPa.

Length of the battery case 11: About 100 mm
Outer diameter of the same: 25 to 35 mm
Diameter of the core space 16: About 8 mm
Wall thickness of the battery case 11: About 0.4 to 0.5 mm
Thickness of the top plate 13: About 0.6 to 0.7 mm
Thickness of the thin portion 37 of the top plate 13: About 0.3 to 0.4 mm
Thickness of the current collector 26, 31: About 0.4 to 0.5 mm
Thickness of the spacer 41: About 0.4 mm Specifically, the thickness of the top plate 13 is thicker than the wall thickness of the battery case 11. The thickness of the thin portion 37 of the top plate 13 is almost equal to or less than the wall thickness of the battery case 11. It should be noted that the thickness of the thin portion 37 may be thinner depending on the material of the top plate 13.

In case the inside of the secondary battery 10 configured as above is filled with gas due to any cause and the internal pressure rises, the following action occurs in the battery 10. The generated gas flows from gaps in the electrode body group 15 to the core space 16, passes through the core space 16 and then reaches the battery lid 12 side and the top plate 13 side. For allowing gas to flow in such a manner, the core space 16 is left as being void on purpose. Further, the negative current collector 26, the positive current collector 31, and the spacer 41 are formed with through holes 26a, 32, and 42 respectively, each through hole being communicated with the core space 16.

Accordingly, on the battery lid 12 side, the gas going out of the core space 16 accumulates between the current collector 26 and the battery lid 12 through the through hole 26a. The gas then pushes the explosion-proof valve 23, especially, its thin portion 23a, outward. On the top plate 13 side, on the other hand, the gas accumulates on the inner side of the top plate 13 through the through hole 32 of the current collector 31 and the through hole 42 of the spacer 41. The gas then pushes the top plate 13, especially, its thin portion 37, outward.

As the internal pressure further increases, the pushing force against the explosion-proof valve 23 and the top plate 13 becomes larger. The thin portion 37 having lowest strength among them is first deformed. In other words, the thin portion 37 of the top plat 13 is deformed as to warp outward as shown in a secondary battery 10A located on the left side in FIG. 5. Thus, welded portions of the top plate 13 and the protrusions 34 of the current collector 31 are separated. Accordingly, the electric connection between the top plate 13 and the current collector 31 is broken, cutting off the current. If the battery is under charging, further charging is stopped.

In case the internal pressure still further increases, the thin portion 23a of the explosion-proof valve 23 is then broken, releasing the gas to the outside. Thus, the gas release can be achieved through only a predetermined portion. According to the lithium ion secondary battery 10 in the present embodiment, specifically, when the internal pressure rises, the current is first cut off. In case the internal pressure still further rises, the gas is then released through the explosion-proof valve 23. Consequently, at the time when the explosion-proof valve 23 is cleaved, the current has already been stopped. Therefore, it can be treated safely.

Figure 5:
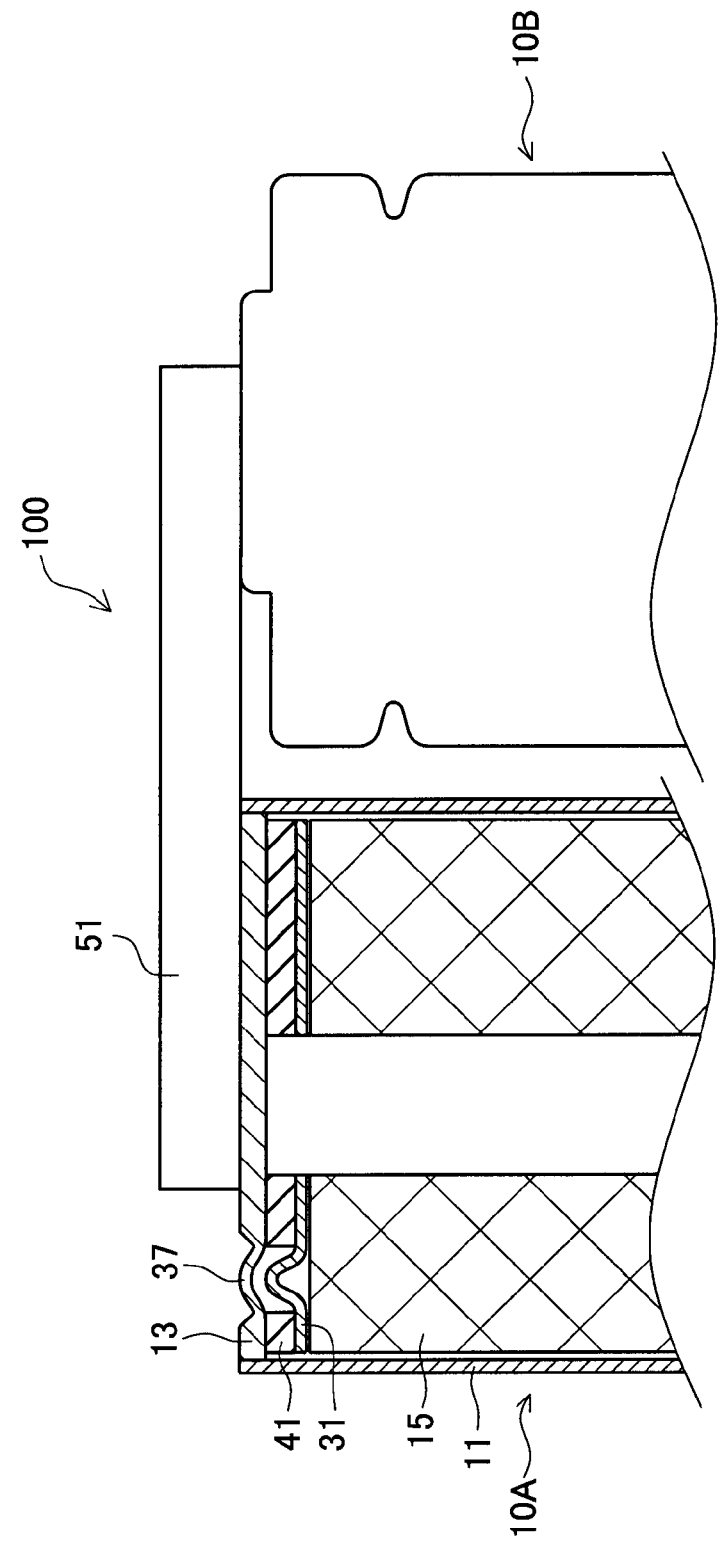
FIG. 5 is a cross sectional view showing connected portions by a bus bar in a battery pack.
Figure 6:
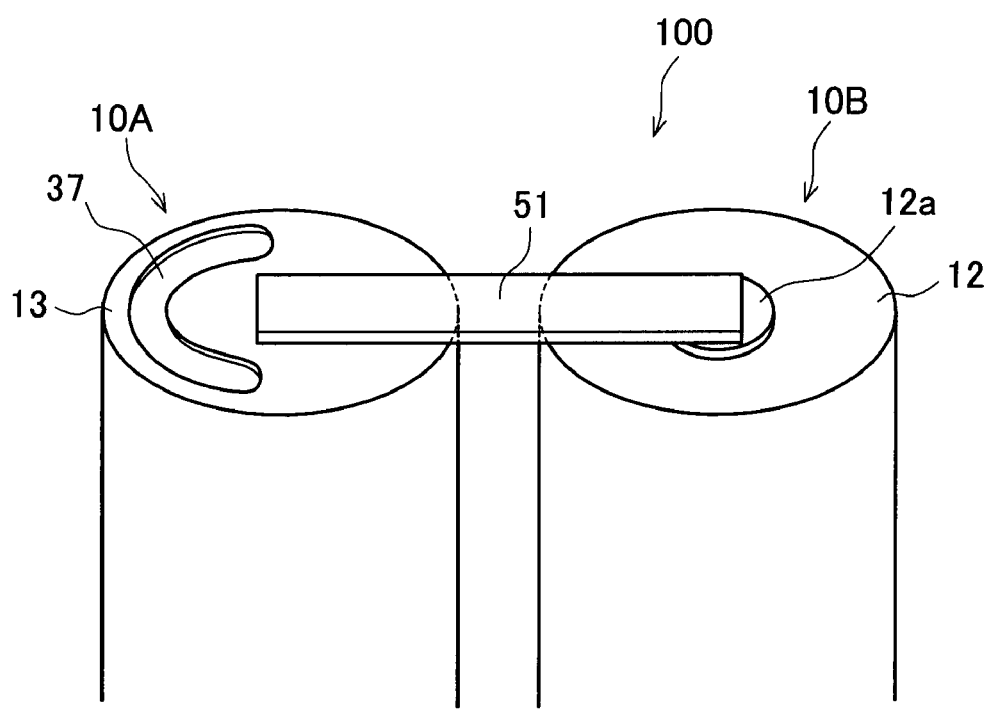
FIG. 6 is a perspective view showing the connected portions by the bus bar.

Next, an example of a battery pack 100 including a plurality of the above secondary batteries 10 will be explained below. For assembling the battery pack 100, two secondary batteries 10A and 10B are arranged side by side in reversed directions and connected to each other with a bus bar 51 as shown in FIGS. 5 and 6. These figures show an example of the battery pack 100 assembled in series connection. In these figures, a positive electrode (a top plate 13) of the secondary battery 10A and a negative electrode (a battery lid 12) of the secondary battery 10B are connected to each other with the bus bar 51. Further, their opposite ends are also alternately connected to other secondary batteries, so that the battery pack 100 is built up in which the secondary batteries 10 are entirely connected in series as a whole.

The bus bar 51 has such a width as covering the central portion 12a of the battery lid 12 and such a length as connecting two secondary batteries 10 in line. The bus bar 51 used herein is illustrated as a rectangular plate but its shape is not limited thereto. In this example, the bus bar 51 has a thickness (e.g. about several millimeters) twice or three times as large as the top plate 13. This is because the bus bar is made of a material which is somewhat poor in conductivity but low in cost in order to minimize the cost of the battery pack 100. For example, a bus bar made of a nickel-plated iron material is used.

When the secondary batteries 10 are to be connected to each other with the bus bar 51 as above, the orientation of the secondary battery 10 whose positive electrode side is connected to the bus bar 51 is adjusted in the circumferential direction about the central axis as shown in FIGS. 5 and 6. To be specific, the bus bar 51 is placed to cover a portion of the top plate 13 other than the thin portion 37. The shapes and sizes of the thin portion 37 and the bus bar 51 may be selected to achieve the above arrangement. This configuration enables the thin portion 37 to be deformed without being blocked by the bus bar 51 even when the batteries are connected to each other with the bus bar 51.

In case the thin portion 37 is deformed due to the increase in internal pressure of the secondary battery 10, the joined portion is separated as shown in the left secondary battery 10A in FIG. 5. Accordingly, in the battery pack 100 including the secondary battery 10A, the current path is broken at that portion. Thus, this situation can be treated safely. When the current path is broken, the thin portion 37 protrudes outward as shown in this figure. This makes it possible to easily externally distinguish which is the secondary battery in which the current breaking structure has worked.

As explained in detail above, according to the lithium ion secondary battery 10 and the battery pack 100 in the present embodiment, the top plate 13 is formed with the thin portion 37. The current collector 31 is formed with the protrusions 34 which contact with the thin portion 37 from the back surface side. In case the internal pressure rises, therefore, the thin portion 37 is deformed outward and hence disconnected from the protrusions 34, breaking the current. Further, the thin portion 37 and the protrusions 34 are of a circular arc shape and formed outside the range on which the bus bar 51 is placed. Even when the bus bar 51 is placed on the top plate 13 in assembling the battery pack 100, the thin portion 37 can appropriately function. Consequently, even when the secondary batteries 10 are connected by the bus bar and used as the battery pack 100, the batteries can appropriately carry out the function of a current breaking structure.

Figure 7:
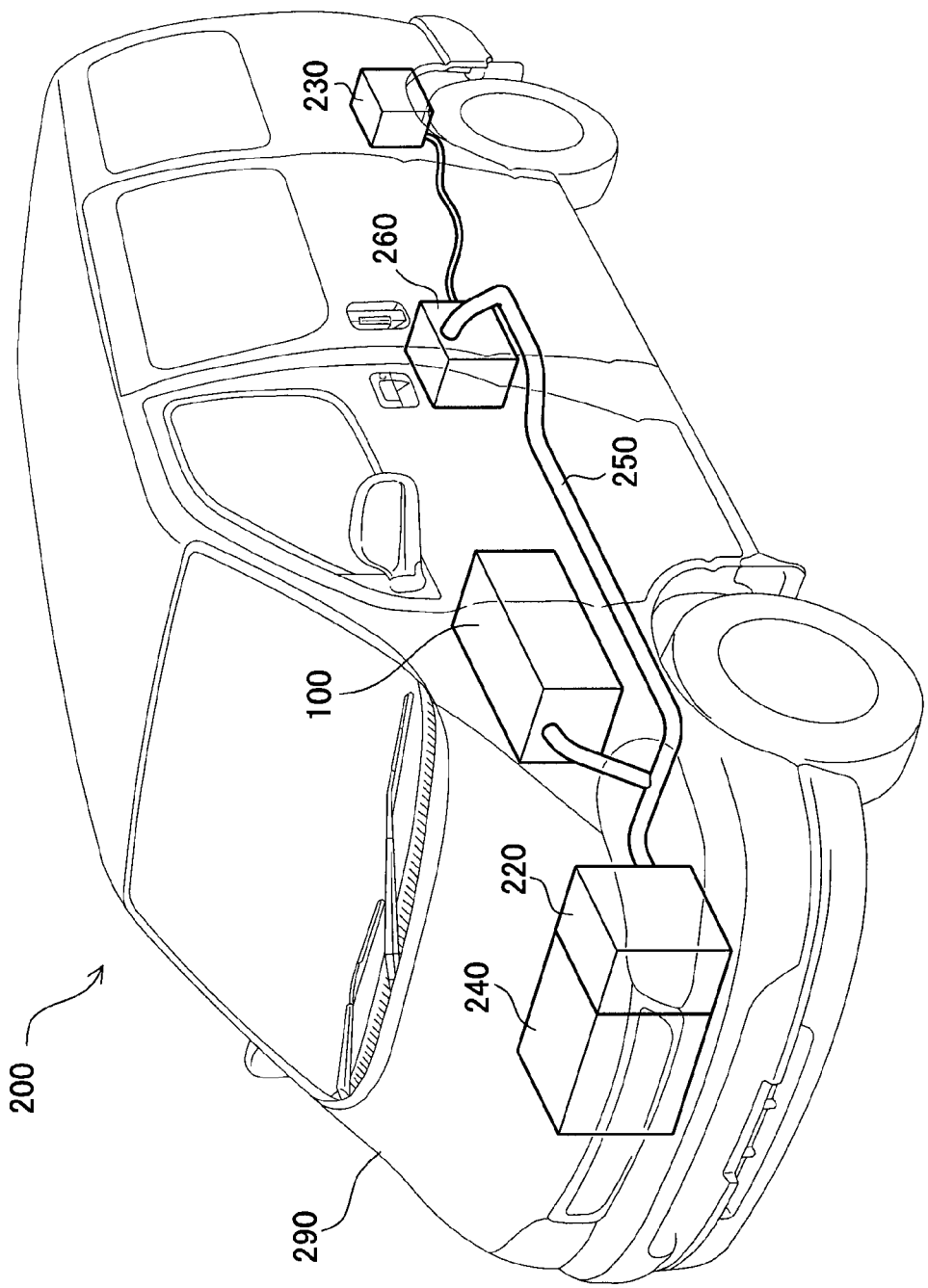
FIG. 7 is an explanatory view showing an example of a vehicle equipped with the battery pack.

The battery pack 100 in the above embodiment can be mounted in a vehicle. Such a vehicle is exemplified in FIG. 7. This vehicle 200 is a hybrid car that drives wheels by an engine 240, a front motor 220, and a rear motor 230 in combination. This vehicle 200 includes a vehicle body 290, the engine 240, the front motor 220 attached to the engine 240, the rear motor 230, a cable 250, an inverter 260, and the battery pack 100 containing a plurality of the secondary batteries 10, so that electric power is supplied from the battery pack 100 to the front motor 220 and the rear motor 230 via the inverter 260.

The vehicle may be any vehicle if only uses electric energy of a battery for the entire or part of a driving source. For example, there are an electric vehicle, a hybrid vehicle, a plug-in hybrid vehicle, a hybrid railroad vehicle, a forklift, an electric-driven wheel chair, an electrically assisted bicycle, an electric scooter, and others.

Figure 8:
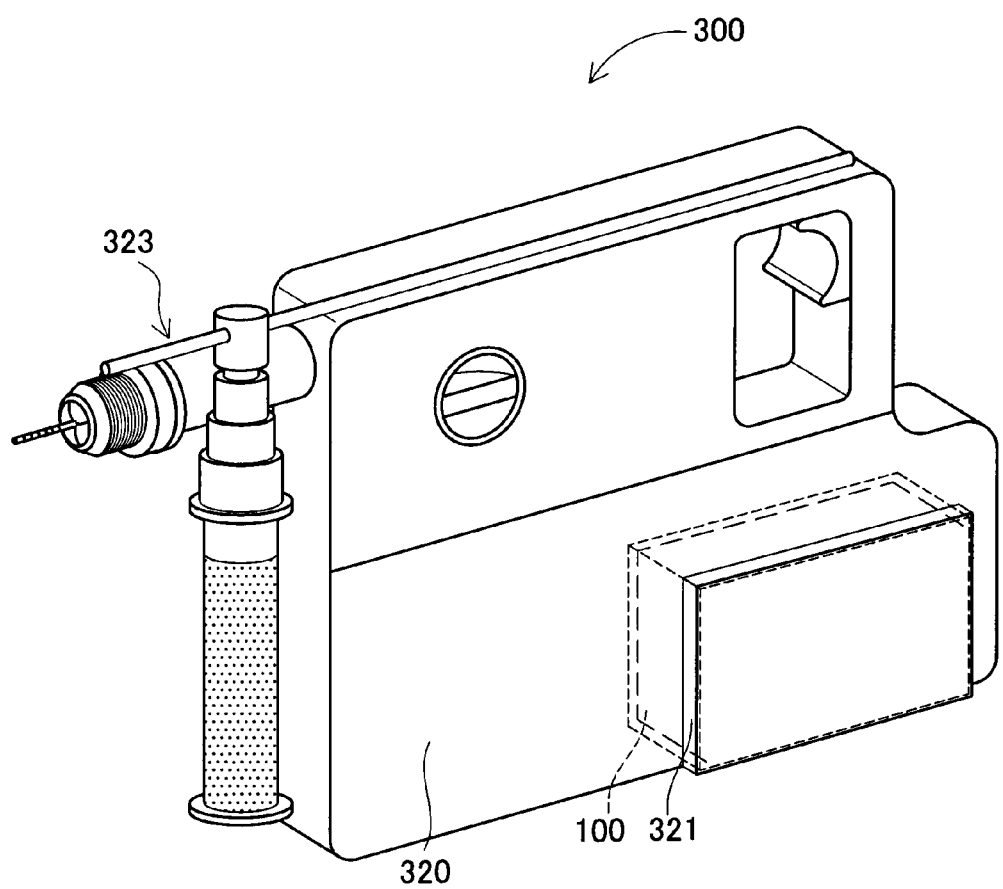
FIG. 8 is an explanatory view showing an example of a hammer drill equipped with the battery pack.

The battery pack 100 in the above embodiment can be mounted in various electric devices. As one example of such electric devices, a hammer drill is shown in FIG. 8. This hammer drill 300 mounts therein the battery pack 100 including the secondary batteries 10 and is a battery-mounting device having the battery pack 100, a main body 320, and an operating part 323, so that electric power is supplied from the battery pack 100 to the operating part 323. The battery pack 100 is removably housed in a bottom 321 of the main body 320 of the hammer drill 300.

The battery-mounting device may be any device that mounts a battery and utilizes it as at least one of energy sources. For example, there are battery-operated home electric appliances, office equipment, and industrial equipment, such as a personal computer, a cell phone, a battery-driven electric tool, an uninterruptible power supply system.

The above embodiment is merely an example of the present invention and does not set limits to the present invention. Thus, the present invention may be embodied in other specific forms without departing from the essential characteristics thereof.

For instance, in the present embodiment, the top plate 13 is a separate member from the battery case 11. As an alternative, a closed-end cylindrical battery case may be adopted. In this case, a thin portion is formed in the bottom of the case in the same manner as in the top plate of the above embodiment. Similarly, in this case, the thickness of the bottom other than the thin portion is preferably determined to be slightly thicker than the wall thickness of a cylindrical body part of the battery case.

Figure 9:
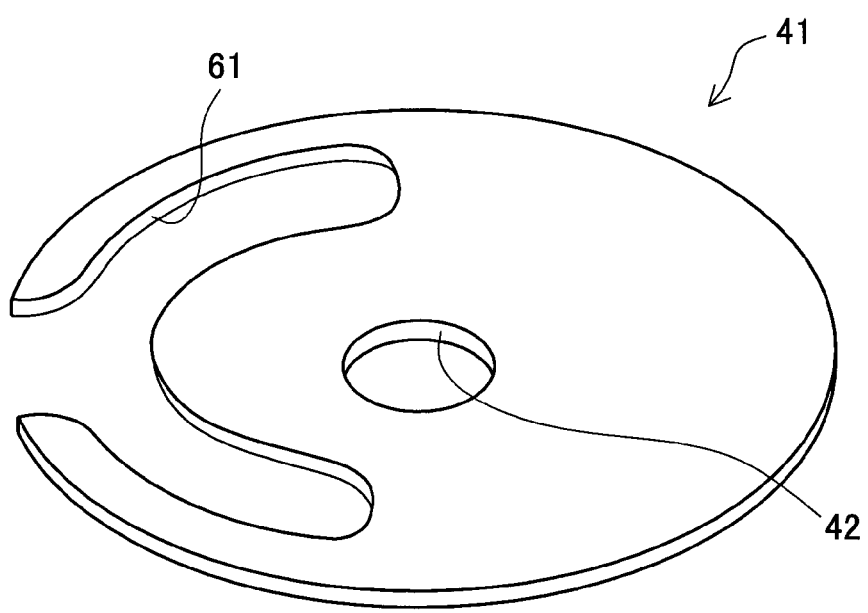
FIG. 9 is an explanatory view showing another example of a spacer.

Furthermore, the shape of the spacer is not limited to the above. For example, a spacer may have a single continuous hole instead of the two through holes 44. A through portion through which the protrusion 34 passes may be not only a hole but also a cutout 61 continuous with the outside as shown in FIG. 9. Even such a shape has only to hold the top plate 13 and the current collector 31 so that any portions of them excepting the protrusions do not contact with each other. The central through hole 42 of the spacer may also be formed to be continuous with either one or both of the two through holes 44. Alternatively, the through hole 42 may be continuous with the outside.

Figure 10:
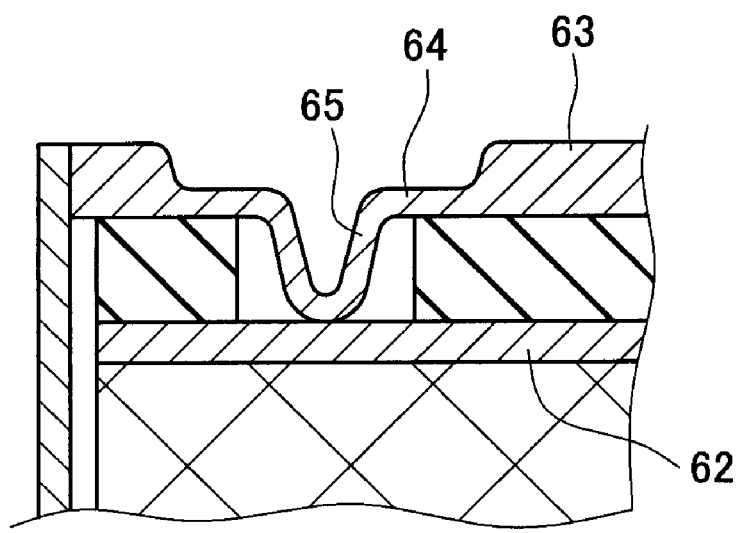
FIG. 10 is a cross sectional view showing another example of a current breaking structure of a secondary battery.

In the above embodiment, the top plate 13 is formed with the thin portion 37 and the current collector 31 is formed with the protrusions 34. As an alternative, a configuration shown in FIG. 10 may also be adopted. Specifically, a current collector 62 is formed with no protrusion. A thin portion 64 of a top plate 63 is partly formed with a deformed region 65 protruding toward the current collector. Even such a configuration also enables the entire thin portion 64 to be deformed outward by internal pressure rise, separating joined portions.

In the secondary battery 10 in the above embodiment, the recessed portions 33 of the current collector 31 are provided at four places; however, the number of recessed portions is not limited thereto and may be more or less. If only the current collector and the electrode plate can be appropriately welded to each other, the recessed portions are not always necessary. Further, the through hole 32 of the current collector may also be continuous with the outside.

Figure 11:
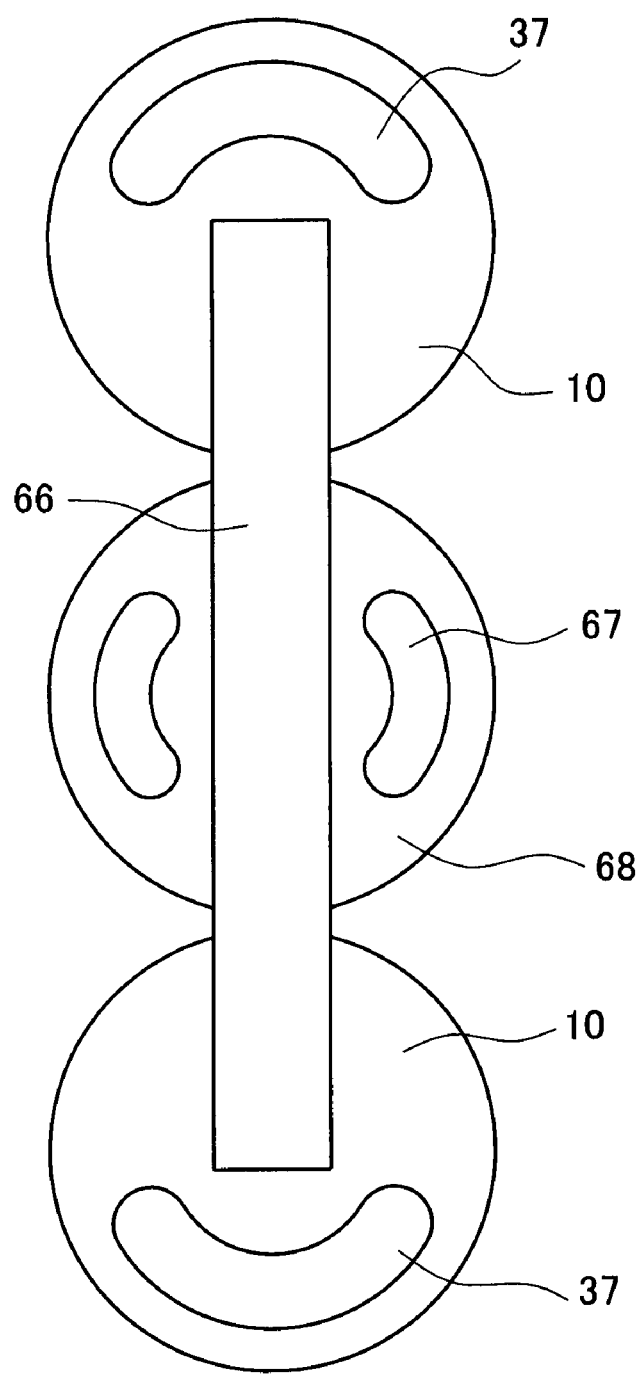
FIG. 11 is an explanatory view showing placement of thin portions in secondary batteries used in a battery pack constituted by parallel connection.

The above embodiment shows the battery pack arranged in series connection but may be applied to a battery pack arranged in parallel connection. In this case, a bus bar has only to be placed to cover a portion other than a thin portion. In the case where three or more secondary batteries are connected in parallel, for instance, a secondary battery having a thin portion in a different position from thin portions of other secondary batteries is centrally placed as shown in FIG. 11. To be concrete, the secondary batteries 10 in the above embodiment each having the circular-arc thin portion 37 are placed at both ends of a linear bus bar 66 and a secondary battery 68 having thin portions 67 on both sides is placed at the center. In this secondary battery 68, the protrusions of the current collector are also formed in positions corresponding to the thin portions 67. In accordance with the shape of the bus bar and the position of each secondary battery, the thin portions have to be placed in positions not overlapping with the bus bar.

REFERENCE SIGNS LIST

10 Secondary battery
11 Battery case
12 Battery lid
13 Top plate
15 Electrode body group
23 Explosion-proof valve
31 Current collector
32 Through hole
34 Protrusion
37 Thin portion
41 Spacer
42 Through hole
51 Bus bar
100 Battery pack
200 Vehicle
300 Hammer drill

The invention claimed is:

1. A battery pack comprising a plurality of secondary batteries and a bus bar connecting the secondary batteries, each secondary battery comprising a cylindrical battery case, a positive and negative electrode body group housed in the battery case, and first and second terminal plates located on both ends of the battery case and connected to first and second electrode bodies of the electrode body group respectively, wherein
the secondary battery further includes:
a current collector placed on an end of the electrode body group on the first terminal plate side, the current collector being connected to the first electrode body of the electrode body group; and
an insulating member placed between the first terminal plate and the current collector,
the first terminal plate is partly formed with a thin portion,
the insulating member is formed with a through portion in a position corresponding to the thin portion of the first terminal plate,
a portion of the current collector placed in a position corresponding to the thin portion of the first terminal plate is in contact with the thin portion of the first terminal plate through the through portion of the insulating member,
the thin portion of the first terminal plate is configured to be deformed outward when internal pressure of the battery rises, thereby breaking electric connection between the first terminal plate and the current collector,
the bus bar is placed so that a portion of the bus bar connected to the first terminal plate of the secondary battery covers a portion of the first terminal plate other than the thin portion,
the electrode body group is a hollow wound body including the first and second electrode bodies wound in overlapping relation with a central portion being hollow, and
the current collector and the insulating member are formed with through holes communicated with the hollow portion of the hollow wound body.

2. The battery pack according to claim 1, wherein
the second terminal plate is provided with an explosion-proof valve for releasing gas out of the battery case when internal pressure of the battery case rises, and
the thin portion of the first terminal plate is configured to be deformed at lower internal pressure than internal pressure of the battery case at which the explosion-proof valve functions.

3. A vehicle comprising:
a motor configured to be driven to rotate by electric power; and
a power source for supplying electric power to the motor, the power source including the battery pack set forth in claim 1.

4. A device comprising:
an operating part configured to be driven by electric power; and
a power source for supplying electric power to the operating part,
the power source including the battery pack set forth in claim 1.

* * * * *